United States Patent [19]

De Longhi

[11] Patent Number: 4,901,633
[45] Date of Patent: Feb. 20, 1990

[54] ROTATING OBLIQUE BASKET FRIER FOR CYCLIC IMMERSION COOKING

[75] Inventor: Guiseppe De Longhi, Treviso, Italy

[73] Assignee: De Longhi s.p.a., Trevison, Italy

[21] Appl. No.: 101,446

[22] Filed: Sep. 28, 1987

[51] Int. Cl.⁴ .............................................. A47J 37/12
[52] U.S. Cl. ........................................ 99/409; 99/348; 99/410
[58] Field of Search .................................. 99/403–411, 99/425–427, 340, 348, 330, 339; 219/389, 214, 405, 411, 438, 239, 240; 366/216

[56] References Cited

U.S. PATENT DOCUMENTS

| | | | |
|---|---|---|---|
| 1,599,805 | 9/1926 | Barsam | 99/409 |
| 1,789,428 | 1/1931 | Deschenes et al. | 99/409 |
| 3,618,587 | 11/1971 | Lee, Sr. | 99/348 X |
| 3,718,485 | 2/1973 | Lankford | 99/410 X |
| 4,203,357 | 7/1980 | Vaussanvin | 99/340 |
| 4,205,803 | 2/1981 | Wohlfart | 99/409 |
| 4,238,997 | 12/1980 | Hengstenberg | 99/348 X |
| 4,685,386 | 8/1987 | Bezon | 99/409 X |

*Primary Examiner*—Timothy F. Simone
*Attorney, Agent, or Firm*—Rosen, Dainow & Jacobs

[57] ABSTRACT

A deep fryer apparatus particularly suitable to home use with a rotatable basket rotating within tray. Both the basket and the tray can be removed from a fixed tray within the housing. The axis of rotation of the basket is greatly inclined with respect to an oil bath contained in tray, so that the food contained in the basket is cyclically and progressively immersed in the oil bath. The bath is heated by adequate heaters, and the apparatus is monitored by control devices.

The new deep fryer features high overall performance and low operating costs. This is due in particular to the small quantity of oil needed to form the oil bath, which is about one-half what is generally necessary, and to the reduced cooking time required as a result of the progressive and repeated elimination of food moisture.

32 Claims, 3 Drawing Sheets

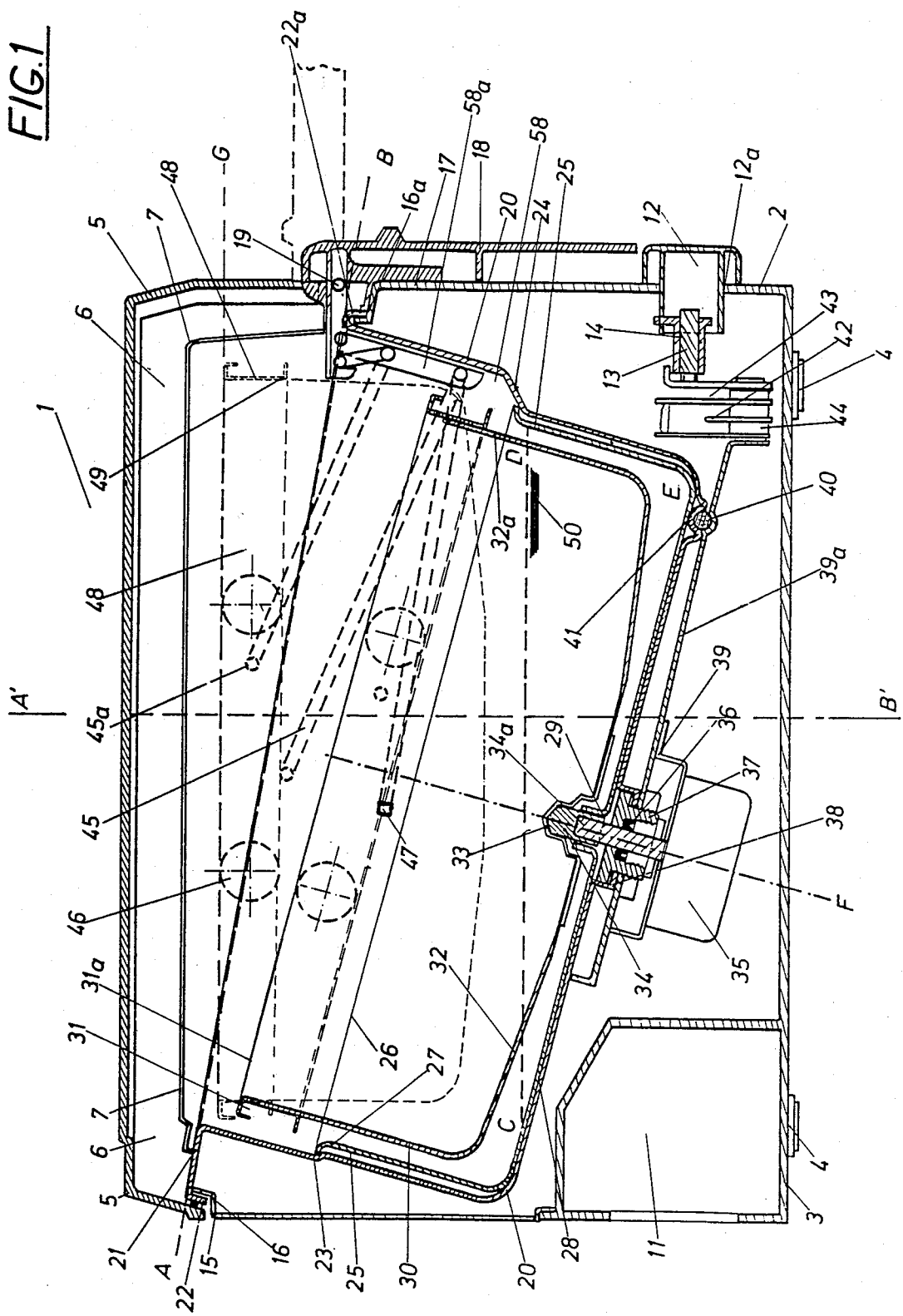

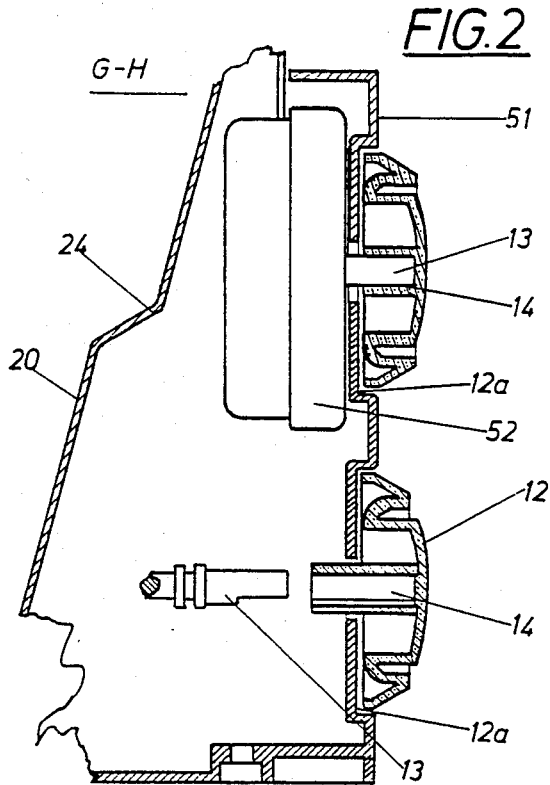
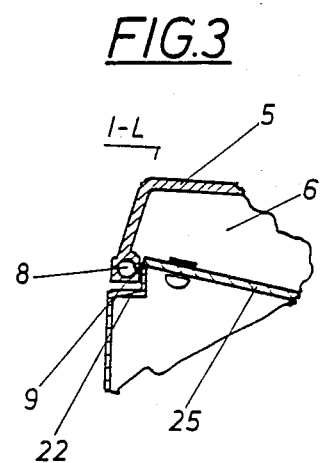
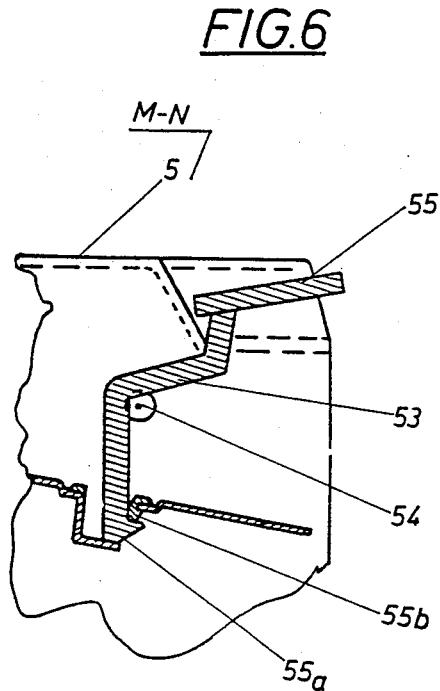
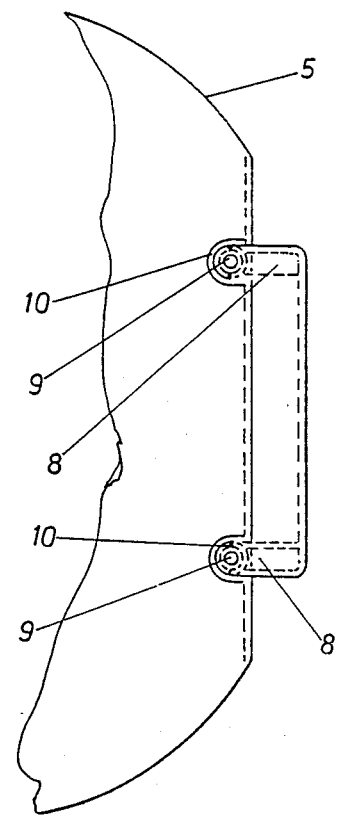

ROTATING OBLIQUE BASKET FRIER FOR CYCLIC IMMERSION COOKING

This invention consists of a rotating-oblique-basket frier for cyclic immersion cooking. The structural and operating components of the frier are inter-related to the basket (whose axis is greatly inclined with respect to the cooking oil bath surface plane, which is itself contained into equivalent-position containers) in such a way that all moving parts, connected to the basket by a reduction gear-box, are progressively and cyclically interrupted by an assisted and controlled thermostat.

BACKGROUND OF THE INVENTION

At the present technical stage, all friers produced and marketed for home use are equipped with vertically-moving baskets only. These types of baskets serve food introduction, extraction and/or draining purposes well, but cannot move during cooking.

However, vertically-moving baskets are inconvenient for a number of reasons.

A first important reason is the high quantity of oil needed for proper cooking, which also means (a) high operating costs due to high power consumption; (b) changing of great quantities of oil due to its exhaustion or to adapt it to the type of food to be cooked.

A second equally important reason is of practical nature, and consists in having to repeatedly move by hand the basket to separate the various food pieces during cooking, which may be rather difficult during the intermediate cooking phases. Furthermore, food cannot be uniformly cooked; the temperature of the oil bath cannot be easily raised; water vapor cannot be freely dispersed; proper cleaning of the oil tray is difficult, even in those cases where the basket can be removed.

SUMMARY OF THE INVENTION

The present invention is an industrially feasible frier which overcomes the above-mentioned shortcomings as follows:

The quantity of oil need for proper cooking is just enough to fill up the lower section of the inclined tray;

The food being fried is cyclically immersed in oil in progressive alternating immersion and emmersions;

During basket rotation, the food elements to be fried are moved and separated. This avoids the problem of food particles sticking together, and allows for proper cooking;

The elimination of moisture naturally present in the food is favored and occurs repeatedly during the immersion phases;

The cooking oil bath is stirred by the rotating basket and/or by its contents, as well as by the heat. This accelerates the heat exchange process, especially at the initial stages, and favors uniform operating temperatures;

The rotational velocity of the basket can vary as a function of a preset temperature according to certain parameters, including interruptions of the rotation and others;

The start-up and operating times are greatly reduced;

Oil dripping is incremented, since the upper sections of the inclined basket are oil free;

If necessary, the complete process can be carried out automatically without any operator's intervention.

Moreover, this unit offers the following secondary advantages:

The removal of the frying basket from the oil tray, and vice-versa, is coaxial to the vertical axis of the frier, allowing for proper oil dripping or any other necessary operation;

The frying basket can be controlled with ease during the insertion, cooking and removal phases, and can be as easily handled during the initial and final phases of the cycle;

All components of the frier can easily be disassembled for proper cleaning;

The vapors forming during the cycle or during its complementary phases are exhausted after proper filtering only;

Both the essential and auxiliary components of the frier are at low cost and highly reliable.

Accordingly to the present patent, the advantages described above are best implemented by this new frier by means of the following:

A wire-netted or forged-tin basket bottom shaped so as to (a) filter the cooking oil bath; (b) keep firmly into place the food to be cooked; (c) isolate the food from undesirable residues. The basket is also equipped with clutches for movement and guidance which are juxtaposed to and coaxial with a removable tray containing the basket itself;

The above tray, shaped so as to keep possible residues, fits with the basket or a fixed tray;

At least a motor, connected to the above-mentioned components, with interconnected water-tight parts and with a supporting structure on which the above components are mounted;

Properly tenoned and protected seals in one or more of the above-mentioned components;

At least one, preferably electric, heater to generate adequate heat output;

Adequate interacting or stand-alone support systems to control and regulate all required functions;

Adequate, multi-purpose basket handles for handling the basket when inside or outside the frier. Such handles permit to maually rotate the basket inside the frier while in use;

A system of connected levers which facilitate basket handling and which permit to place the basket in required positions during the cooking and complementary phases;

An interchangeable filtering system housed within the cover;

Interacting cover locking and closing parts, together with circuit breakers for immediate machine stopping, particularly at open cover;

Where needed, basket or tray finning to direct vapor jets towards predetermined locations;

Adequate structural components to contain the above-mentioned components or complementary and auxiliary parts constituting the new unit;

Adequate materials which are coordinated and properly shaped, with surface treatments and/or structural treatments as needed;

Materials which are not excessively costly but fully reliable;

Where necessary, structural reinforcements connected with their relative components.

The invention, as it has been described, solves the problems mentioned above for it consists of an oblique-rotating-basket frier for cyclic immersion cooking which is industrially feasible and free of the problems faced by conventional frying units.

The advantages deriving from this invention, as it has been described, can thus be implemented through the construction or this new frying unit.

The frier fulfills home, industrial and other purposes and is characterized by excellent qualities these qualities consist in the limited quantity of oil needed to form the cooking oil bath (i.e., almost ½ of what is generally need); in the rotating basket, crucial to the quick elimination of food moisture; in the uniformity of the gradual and final mutations; and in the homogeneous heat exchange process.

All these are specific advantages of this innovative system, i.e., an oblique rotating basket greatly inclined with respect to the cooking oil bath, as opposed to systems mounting fixed baskets whose contents are always completely immersed in the oil bath.

Moreover, considering the small quantities of oil need fill the sole lower inclined sections of the oil tray, and considering that the food is cyclically immersed into the oil, this unit is characterized by a number of advantages regarding what type of cooking is needed, the reduction of operating time and the overall performance of the frier.

During bench tests, it has been ascertained that the cyclic and alternating immersions and emersions greatly favor the elimination of food moisture. Moisture elimination, in fact, occurs especially in the upper sections of the rotating basket which are oil-free, and is increased by the stirring action of the iron-knitted basket. This does not occur in conventional frying units, where moisture is eliminated by manually shaking the basket and/or its contents.

The obvious effects of the rotating basket, aside from reducing cooking time, from continuously stirring the oil bath, and from giving a homogeneous oil temperature, are such that the single food pieces undergoing frying are separated, during their immersion, by the action of vapor bubbles developing in the bath, as well as by means of the interactions and counter-pressures occurring between the food surfaces.

BRIEF DESCRIPTION OF THE DRAWINGS

The invention is described in detail, for illustration purposes, by means of drawings representing one of the possible ways in which the frier will be assembled. The drawings consist of the following:

FIG. 1 shows the scaled-down vertical sections A'-B' of the new frier.

FIG. 2 shows section G-H of the control panel. elements of the cover.

FIG. 3 shows section I-L of the joint

FIG. 4 shows the top view of the components illustrated on FIG. 3.

FIG. 6 shows section M-N of the cover closing device

FIGS. 1 to 7 represent, in conformity with the present invention, the optimal realization of the oblique-rotating-basket frier for cyclic immersion cooking.

DETAILED DESCRIPTION OF THE PREFERRED EMBODIMENT

Figure 5:
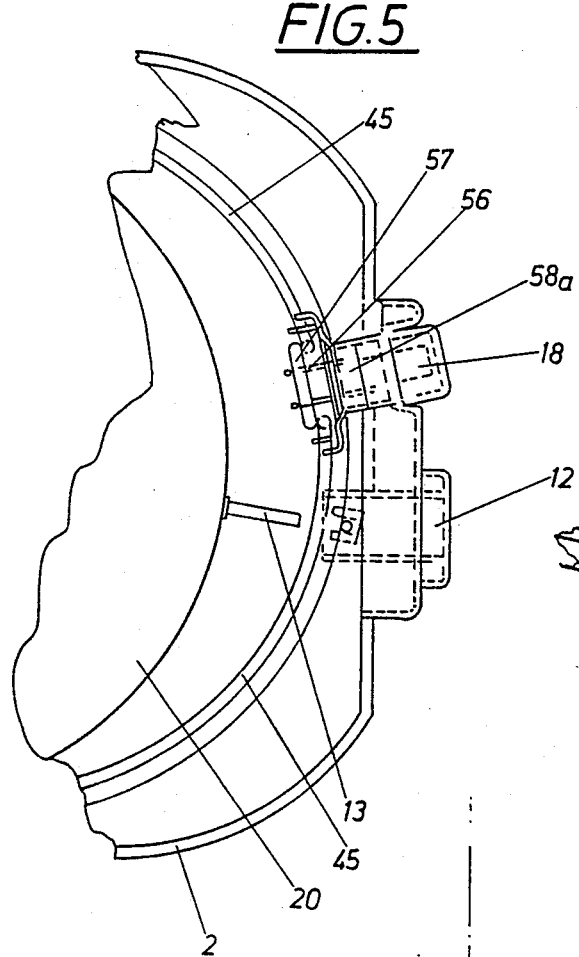
FIG. 5 shows a partial scaled-down top view of the basket handling device.

As shown in FIG. 1, and according to the invention, the unit 1 is essentially constituted by the following operating and structural components:

A streamlined enveloping cover 2, whose bottom 3 rests on the supports 4, complete with a cover 5, with an empty chamber 6 formed between the counter cover 7 which hosts a set of filters (not shown here); the cover can move on pivoted 9 hinge 8 installed in their housing 10, as shown on FIGS. 3 and 4.

A structure 2 in conformity with sector 11 (which contains accessories) and with the knobs 12 housings 12a to regulate the thermostat 42 and an optional "timer" 52. The structure is joint to sector 11 by means of tenoned pivots 13 in the jointed cavities 14, as shown in FIGS. 1 and 5.

An upper side of the above-mentioned cover 2, with an oblique profile, indicated by the broken line AB, with the side 15 adjacent to the joint of cover 5, and with form grindings 16 adjacent to the joint of cover 5, and with form grindings 16 coordinated to the equivalent and juxtaposed ones 16a on side 17 near handle 18, hinging on pivot 19, as shown on FIGS. 1 and 3.

A tray holder 20, with upper section 21 whose sides 22 and 22a are molded so as to support 16 and 16a, in structure 2. The tray holder is shaped (22 and 23) so as to support a removable tray 25, as shown in FIGS. 1 and 2.

A removable tray 25, connected to the above-mentioned holder 20, with upper section 26 and sides 27 which can be rested on 23 and 24 in tray holder 20. The removable tray is equipped on its bottom 28 with a central jack 29, as shown on FIG. 1.

A basket 30 constructed of wire-knitted materials, with a side 30 on its mouth 31a and with a bottom 32. The basket is equipped with a shaped plate 33 which can be mounted on pivot 34 connected to the rotating shaft 34a of the motor reduction gear 35. The connection is sealed by 36 which is itself contained into support 37 housed in 38 which lies in the tray holder 20, as shown on FIG. 1.

A motor reduction gear system 35 connected, by shaft 39, to the equivalent 39a shaft blocking the electrical resistance 40 mounted in the circular counterhousing 41, itself mounted on the holder 20 and connected to the thermostat 42 (a bimetallic lamels type 43), mounted on the base 44, FIG. 1.

A system connected to the moving handle 18 on hinge 19, of joint levers 45, which envelope 32a the basket and its upper lip 31, with rotating 46 and fixed 47 guide blocks on its upper lip 31 to move freely, as per FIGS. 1 to 7.

An oil both 50, as cooking medium, sufficient to fill sector CDE of the removable tray 25.

Having said the above, the constructive novelty and the basic functions of the unit are shown, in conformity with the invention, on FIG. 1. FIG. 1. shows, on a vertical section, the frier as a whole with its essential structural and operating components 2 to 61, which are coordinated to fulfill the above-mentioned purposes. The basket 30, introduced into the tray 25, with an extremely inclined F axis and containing a quantity of adequately heated oil 50 in section CDE, and joint on the rotating pivot 34 by means of connector 33, cooks its contents by rotating, thus carrying out cyclic immersions and emersions.

The low quantity of oil needed is clear, for it is limited to the amounts necessary to fill the sole above-mentioned section. It is also clear how food moisture is eliminated, cycle by cycle, while the food is cooking, without influencing the temperature of the oil bath 50.

Once the frying process is completed, the basket 30 (supported by the articulated arm system 45) is rotated using handle 18 until position G is reached. Once rotated, the oil is drained and the basket removed by means of components 18, 31, 32, 45 to 49 and 60. The introduction of the basket is clear. It is also clear how the removal of tray 25 (carried out by removing it from its housings 23 and 24 and from the plane 29 which sticks out of the fixed container 20) is possible. The temperature of the oil bath 50, heated by at least one electric coil 40, is controlled by thermostat 42, while the cycle is controlled by timer 52. Both the timer and the thermostat can be adjusted by acting on knobs 12.

FIG. 2 shows the section housing the above-mentioned kno 12 and is placed half-way into the control panel 51. Panel 51 also houses a number of other control knobs, such as those to preset the cycles 52.

FIGS. 3 and 4 show joint 8 of the cover 5 with 6, with components 9 and 10 connected to side 22 and 21 in tray 20. Whereas, FIG. 5 shows one of the uses of device 18, which allows the handling of basket 30, equipped with 58a joining lever 45 by means of parts 56 and 57.

FIG. 6 shows part 53 (which locks cover 5) hinged on pivot 54 adequately shaped. The function of part 53 is carried out by acting on handling section 55 by first acting on part 55a which hooks on section 55b tried to cover 5.

Figure 7:
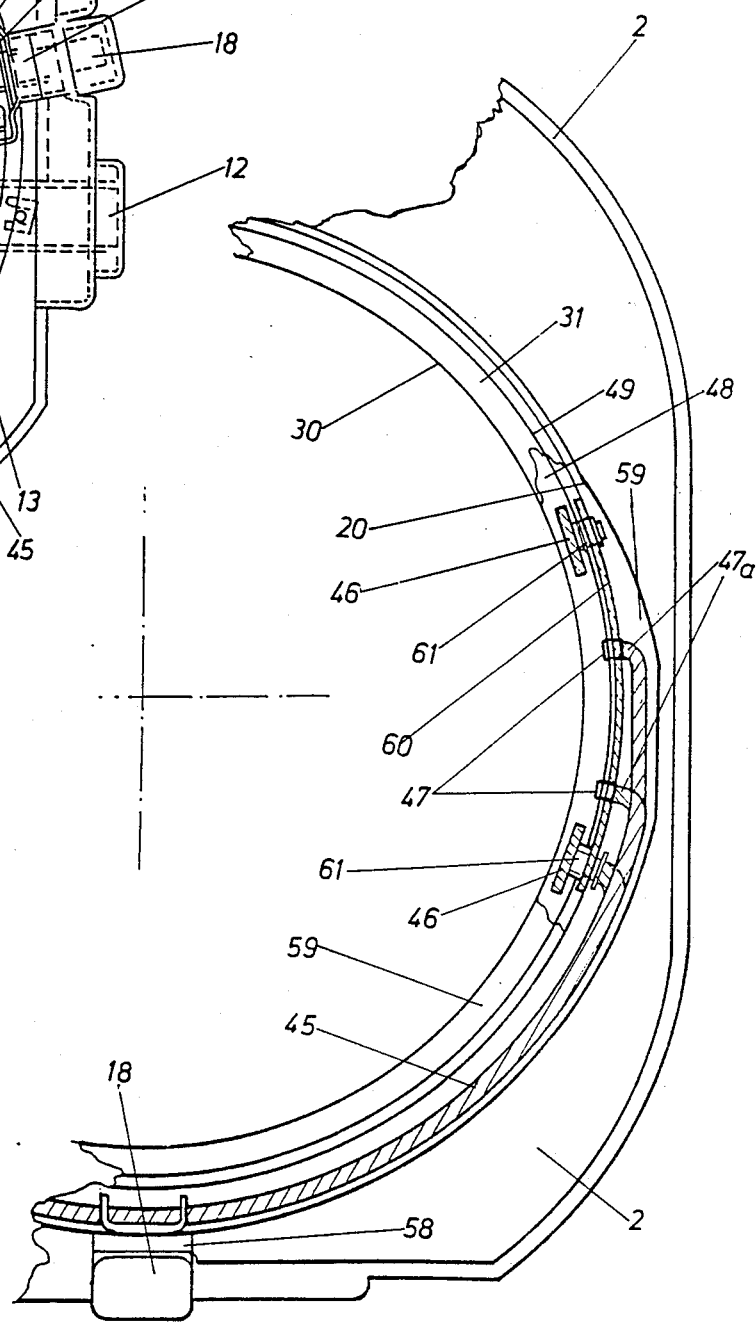
FIG. 7 shows a partial top view of the basket guidance and handling device consisting of articulated arms connected to the handle.

FIG. 7, a top view, shows a basket 30 guide and lift system connected to handle 18. The system can be tied to pivot 29 as guided by means of lever 5Ba housed in sector 48, and kept along with its components 31, 45a, 46 to 49 and 61 also shown on FIG. 1.

FIG. 1 shows, on a vertical section A'-B', the fixed container 20 with sector 58a, housing arm 58, which connects and moves articulated lever 45. These can be seen on FIG. 7, which shows one of the side housing 59 adequate to the movements of the levers.

The invention, as it has been described, can be modified and varied according to specific purposes without compromising the performance and characteristics.

As a matter of fact, the new unit is compatible with heaters other than electric ones, e.g. propane heaters used on conventional units. Installation of this new heating equipment necessarily requires small structural changes and adjustments.

The new unit is designed to operate at different speeds and/or interrupted cycles and/or counter-rotations, in order to satisfy various cooking requirements, such as the types of food to be cooked, their quality and characteristics, the various kinds of oil used, etc.

The filtering system can be positioned as needed and its functions can be carried out with the assistance of flaps and intakes which can direct steam jets where needed.

The basket, with a sensibly concave or convex bottom, is attached to cylindrically or cone-shaped plating and deflectors which separate heterogeneous foods or contribute to their homogeneity.

To vary the inclination of the operating unit, it is sufficient to adjust a moving device equipped with appropriate handles and stabilizers.

By greatly inclining the operating unit, it is possible to accomplish special tasks such as the rolling of its contents to increase mixing.

These results can be accomplished by utilizing rotating baskets whose axis are parallel to the oil bath and which are equipped with all necessary devices for food loading and unload and for their rotation carried out by means of clutches and attachments They can also be accomplished by utilizing baskets which can be removed by means of handles, as described.

The present frier can also be constructed utilizing a basket moving on rollers situated on the sides of the fixed tray. The basket is driven by means of a motor system housed in the cover or by a motorized roller. In this last case, the parts opposite to the roller would serve as guides and supports to the baskets. The above-mentioned basket, which can accommodate another smaller basket within it, can be constructed in solid metal to allow for special cooking tasks, such as the so-called "waterbath" treatments.

By adding to the counter cover an adequately shaped piece, will be possible to increase food mixing.

For the so-called "waterbath" food treatments, as in the case of swelling cereals, it is possible to introduce a basket similar to those described above, within an outer basket. In this way, the cereals are just lapped by the oil bath and swell hin the internal basket.

Clearly, the above-mentioned system may also be discarded. If disregarded, the food may be introduced directly into the outer basket. A rotating, bladed shaft then mixes the food contents in the outer basket during cooking.

The basket can be independent from its handle, and can be grasped and handled within the oil bath as needed.

Safety devices can also be installed as part of the accesory components of the unit. These devices may be inter-related with a number of parameters and devices (e.g. with some of the above-mentioned systems or with predetermined temperature levels of the oil bath, etc.), so as to automatically open the frier cover, rotate and/or handle the basket, etc. These safety devices may include check lights or acoustic signals which interwith the operations of the unit indicating oil temperature various unit functions.

The advantages of this innovative unit, specially designed particularly for home use, can thus be appreciated through a careful study of the above description.

All construction details shown and described here, including all essential or accessory components and parts, may be replaced with technically equivalent components and parts.

During bench tests and prototype construction, we have ascertained that the materials and components employed are adequate to all above-mentioned intents and purposes.

all rights for the present unit, as specified in the following claims, are reserved for the entire duration of the patent.

What is claimed is:

1. A deep fryer, operable with a quantity of oil for cooking a quantity of food, comprising a housing defining a chamber therein for containing said quantity of oil which oil will have a top surface defining a horizontal plane, a perforated basket for holding said quantity of food rotatably mounted in said chamber, the basket being rotatable such that food in any part of the basket is cyclically and repeatedly moved to be below and then above said horizontal plane of said oil, the basket having a central axis of rotation and being rotatably mounted in said chamber with said central axis oblique relative to vertical, drive means in said housing for rotating said basket such that said food can be cyclically immersed and emersed in said oil, and means in said housing for heating the bottom of said chamber and said oil therein.

2. Apparatus according to claim 1 wherein said basket is removable from said chamber, further comprising handle means for engaging and selectively lifting said basket out of said vessel and inserting said basket into said vessel.

3. Apparatus according to claim 1 further comprising means for moving said basket between a first position where said basket central axis is generally vertical and said basket is substantially out of and above said horizontal plane, and a second position where said axis is oblique and a portion of said basket is below said plane.

4. Apparatus according to claim 3 further comprising handle means for engaging and selectively lifting said basket out of said vessel and inserting said basket into said vessel, in said handle means being movable between first and second positions and further comprising latch means for releasably moving said basket between its first and second positions respectively when said handle means is moved between first and second positions.

5. Apparatus according to claim 3 further comprising a lid for releasably closing and sealing said vessel.

6. A deep fryer, operable with a quantity of oil for cooking a quantity of food, comprising a housing defining a chamber therein for containing said quantity of oil which oil will have a top surface defining a horizontal plane, a perforated basket for holding said quantity of food rotatably mounted in said chamber, the basket being rotatable such that food in any part of the basket is cyclically and repeatedly moved to be below and then above said horizontal plane of said oil, drive means in said housing for rotating said basket such that said food can be cyclically immersed and emersed in said oil, means in said oil therein said chamber having a bottom wall and a liquid-sealed rotary coupling extending through said wall with input and output parts below and above said wall respectively, and said drive means comprises an electric motor with an output shaft mounted in said housing below said bottom wall and coupled to said in out of said rotary coupling, said output of said rotary coupling being releasably engageable to said basket for rotating same.

7. A deep fryer operable with a quantity of oil, comprising: a housing, a fixed vessel within the housing for containing a quantity of oil which oil defines a horizontal top surface when the apparatus is positioned in upright position, a basket of generally cylindrical shape having a central axis and being positionable in said vessel with said central axis oblique from vertical, said basket adapted to be inserted in and removed from said vessel, said basket being rotatable while in said oblique position, said basket positioned in said vessel such that when said quantity of oil is present in said vessel, a portion of its bottom will be beneath said top surface of the oil and a diametrically opposite portion will be above said top surface of the oil, said basket, as it rotates, having each part of its bottom cyclically immersed and emersed from said oil, drive means in said housing for rotating said basket while in its oblique position, means in said housing for heating the bottom of said vessel and any oil therein, and a lid for covering and closing the top of said housing.

8. Apparatus according to claim 7 wherein said housing has a central vertical axis, the housing further comprising means for varying the inclination of said axis for correspondingly varying the position of the top surface of the oil in the vessel.

9. Apparatus according to claim 8 wherein said means for varying inclination comprises at least one variable height foot on said housing at the bottom thereof.

10. Apparatus according to claim 8 wherein said means for varying inclination comprises a plurality of variable height feet on said housing at the bottom thereof.

11. Apparatus according to claim 7 further comprising means for lifting said basket out of said vessel.

12. A deep fryer operable with a quantity of oil, comprising: a housing, a vessel fixed within the housing for containing said quantity of oil, a basket having a central vertical axis when in upright position, said basket being selectively positionable in said vessel in said upright position and in a second position with said central axis oblique from vertical, said basket adapted to be inserted in and removed from said vessel when said basket is in its upright position, said basket being rotatable while in said second position, drive means in said housing for rotating said basket when it is in its second position, heating means in said housing for heating the bottom of said vessel and said oil therein, and a lid for covering and closing the top of said housing.

13. Apparatus according to claim 12 further comprising means engaging said basket for inserting it into and lifting it out of said vessel.

14. Apparatus according to claim 13 wherein said basket comprises has a top part and a round rim circumscribing said top, and a frame engaging at least a part of said rim, the basket being freely rotatable relative to said frame, said means for lifting said basket comprising a handle engageable by a user, first coupling means on said handle for engaging said frame and selectively maintaining said basket in its upright position or partially releasing said basket allowing it to tilt to its said second position, receiving means on said housing for releasably receiving and holding a portion of said handle when said basket is placed in its upright position in said vessel, said first coupling means operable to move said basket to its second position, said lid being closable and sealable while said handle is engaged by said receiving means.

15. Apparatus according to claim 12 wherein said drive means comprises an electric motor with a rotary output shaft, the motor mounted in said housing below said vessel, and a liquid-sealed rotary coupling extending through the bottom of said vessel, said rotary coupling having drive and driven parts, said motor output shaft in drive engagement with said rotary coupling's driven part, said rotary coupling's driven part releasably couplable to said basket when it is in its second position.

16. Apparatus according to claim 12 wherein said vessel comprises side walls and a bottom wall, said drive means comprises an electric motor with an output part, the motor mounted in said housing outward of said vessel walls, and a liquid-sealed rotary coupling extending through a wall of said vessel, said rotary coupling having drive and driven parts, said motor output part in drive engagement with said rotary coupling's driven part, said rotary coupling's drive part releasably couplable to said basket when it is in its second position.

17. Apparatus according to claim 14 wherein said rim has an outward facing groove around its full periphery, said frame has a plurality of projections extending into said groove, said basket being rotatable relative to said frame with said projections slidable in said groove, said frame with its projections in said groove capable of supporting said basket from falling, said basket with said frame being positionable in said vessel in said second position of said basket.

18. Apparatus according to claim 17 wherein said first coupling further comprises a lock pin movable between lock position where it extends into said groove of the basket and unlock position where it is retracted from said groove, said first coupling, when in said lock position, secures said basket from tipping relative to said frame and handle, said lock pin, when retracted permitting said basket to tip to its said second position, and means for moving said lock pin between lock and unlock positions.

19. Apparatus according to claim 18 further comprising control means on said handle for selectively moving said lock pin between its locked and unlocked positions.

20. Apparatus according to claim 19 wherein said handle is pivotable between up and down positions said means for lifting said basket further comprises pivot means allowing said handle to pivot relative to said first coupling means, said handle being coupled to said lock pin such that pivoting said handle to its up position automatically rotates said basket from its second to its first position and extends said lock pin to its lock position, whereby said basket in its first position can be lifted out of said vessel.

21. Apparatus according to claim 14 wherein said handle is pivotable between up and down positions, and wherein said first coupling means comprises a bar having first and second opposite end parts respectively and an intermediate fulcrum part, the fulcrum part is mounted in said first coupling means, the first end part engaged and movable by a part of said handle when it is pivoted between its down and up positions, the second end part engaging said frame, whereby movement of said handle from down to up positions automatically moves said first part to pivot, which thereby pivots said second part, which thereby lifts said frame and basket from said inclined position to said upright position.

22. Apparatus according to claim 12 wherein said lid includes perforations therethrough, said lid further comprising an inner surface and filter means removably secured to said inner surface.

23. Apparatus according to claim 12 further comprising thermostat means for regulating heat from said heating means.

24. Apparatus according to claim 12 to further comprising blower means mounted in said housing and duct means for directing air flow from said blower means to and through said filter for exhausting vapors generated during cooking.

25. Apparatus according to claim 12 further comprising means for selectively reversing and varying the speed of rotation of said motor and of said basket.

26. Apparatus according to claim 12 further comprising a plurality of rollers situated at the bottom for rotatably supporting said basket.

27. Apparatus according to claim 12 further comprising a plurality of rollers situated in said vessel for rotatably supporting the outer surface of said basket.

28. Apparatus according to claim 27 further comprising means coupling said drive means to said rollers for driving said basket in rotation.

29. Apparatus according to claim 12 further comprising a tray removably situated in said vessel for hold said oil.

30. Apparatus according to claim 13 wherein said means for lifting comprises a handle permanently attached to said basket.

31. Apparatus according to claim 12 wherein said basket comprises a wire mesh structure.

32. Apparatus according to claim 12 wherein said basket comprises perforated sheet metal.

* * * * *